Feb. 19, 1963 E. JASCHINSKY ET AL 3,077,897
FEED CONTROL DEVICES FOR LIQUID FUEL BURNERS
Filed April 24, 1959 7 Sheets-Sheet 1
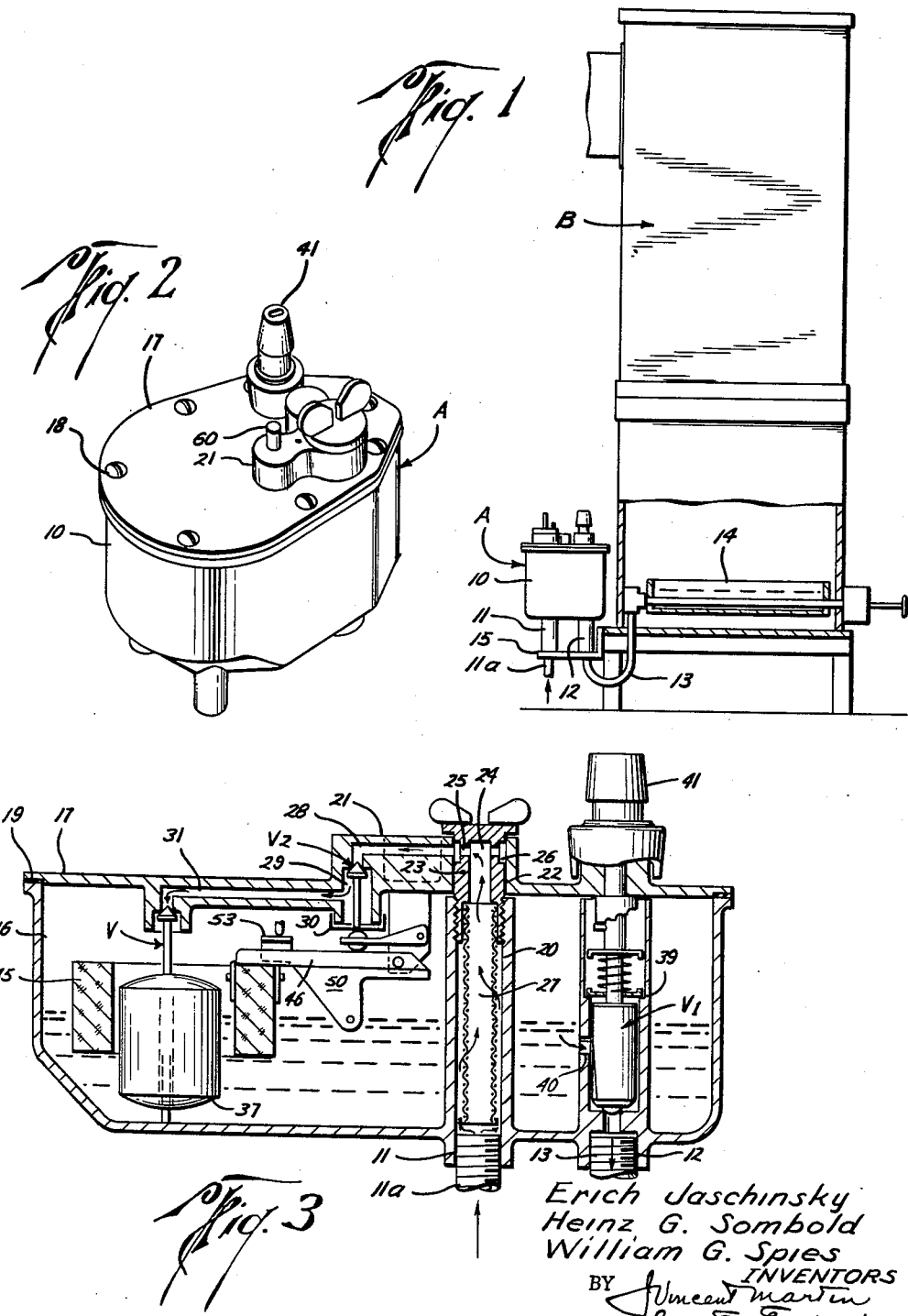
Erich Jaschinsky
Heinz G. Sombold
William G. Spies
INVENTORS
BY Vincent Martin
Joe E. Edwards
M. H. Goff
ATTORNEYS

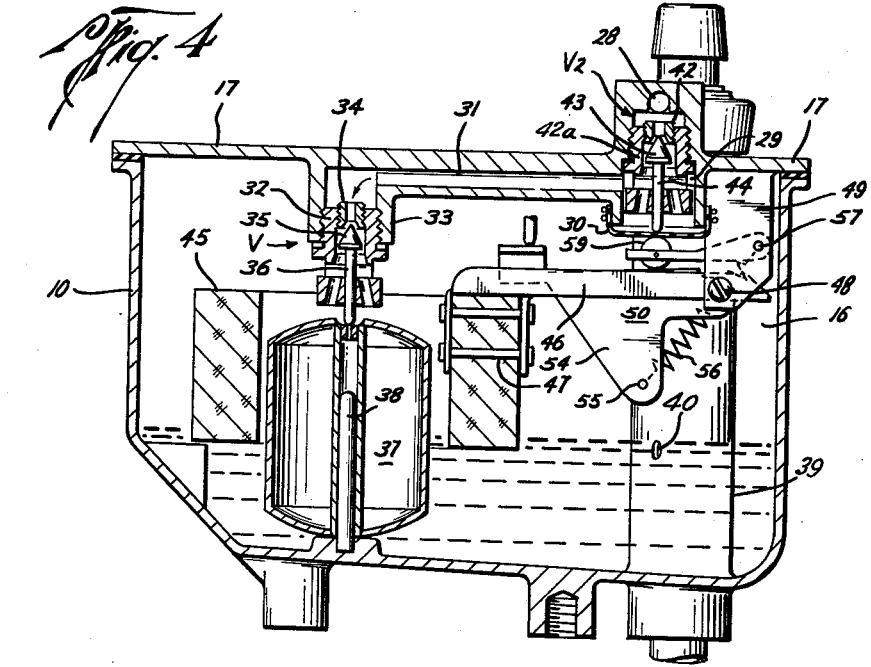
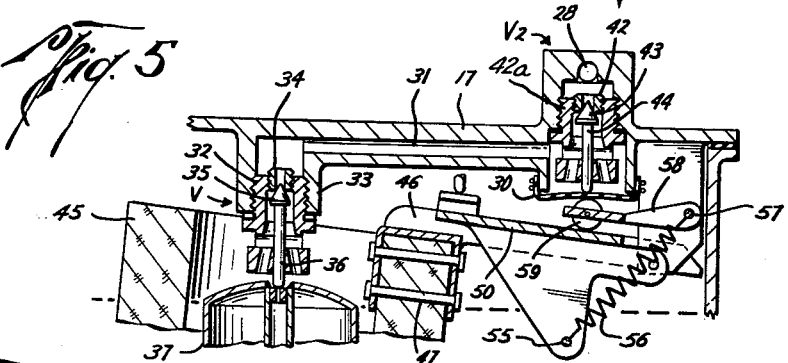
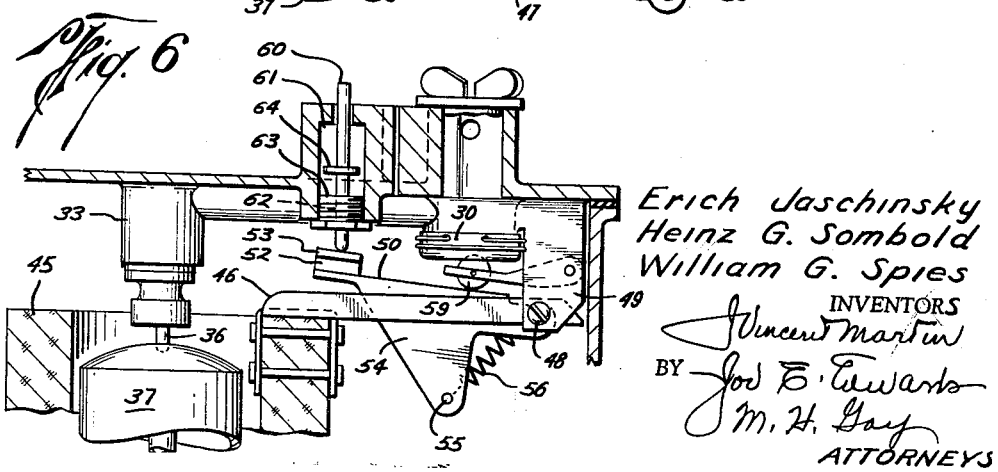

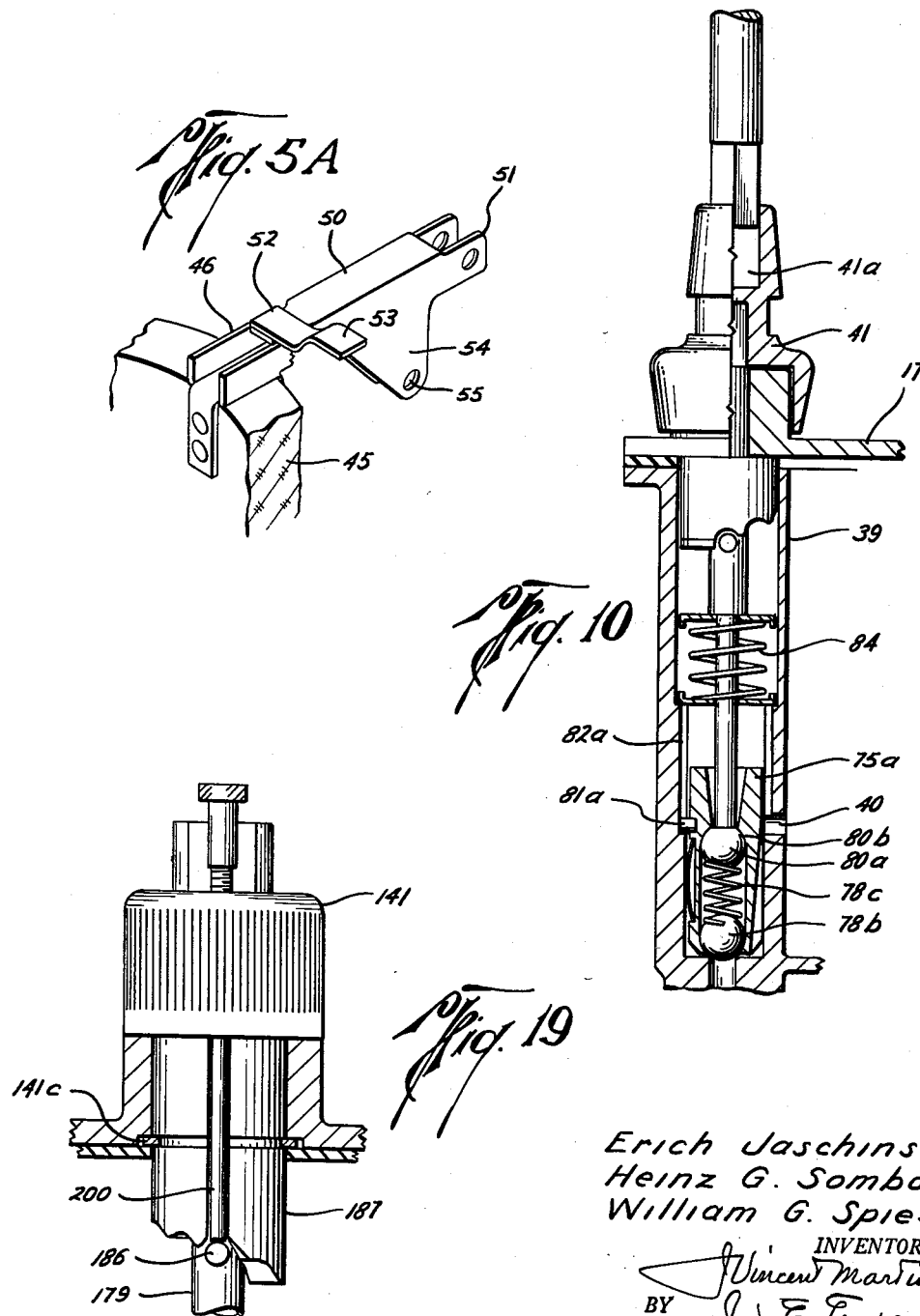

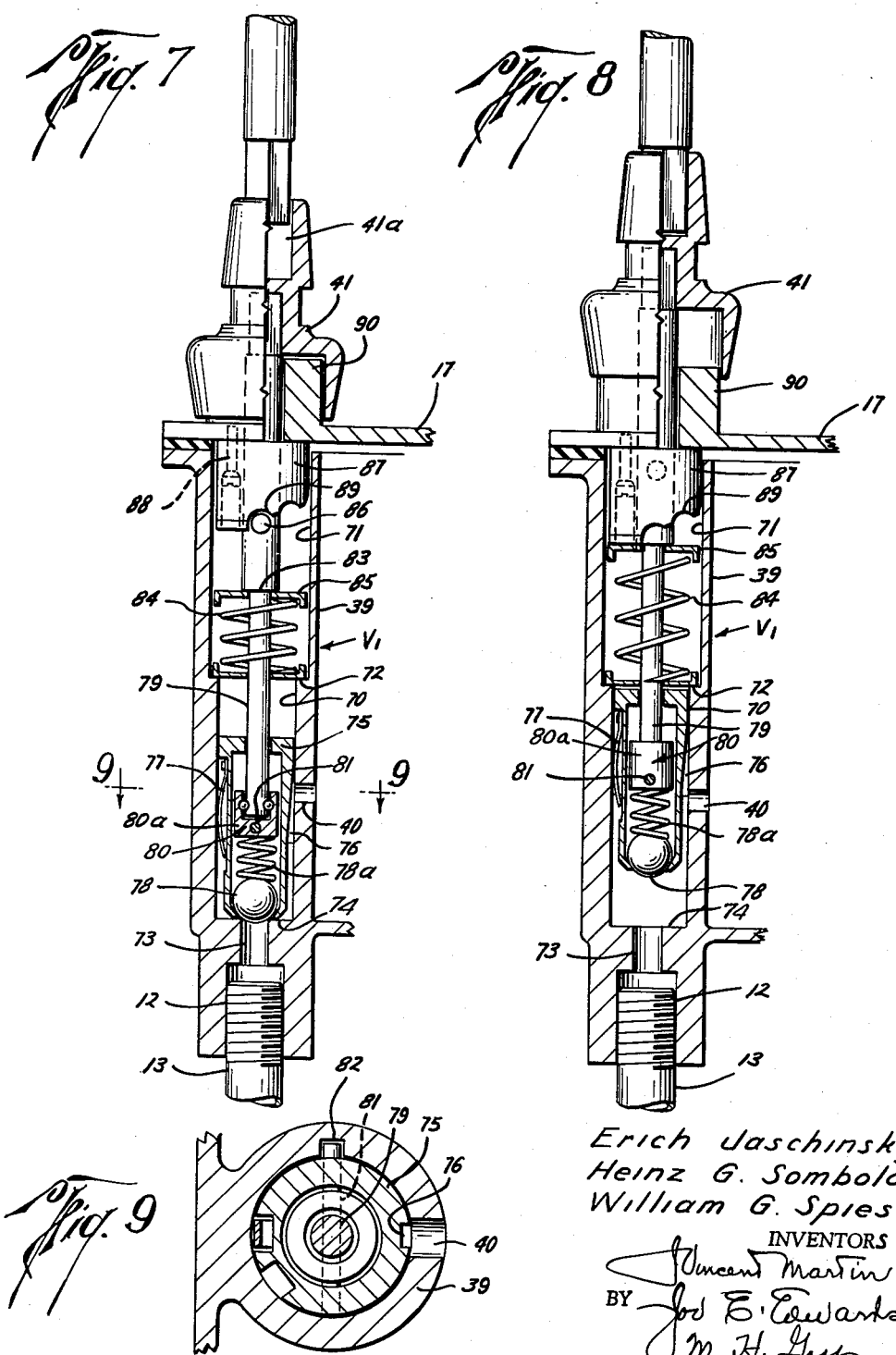

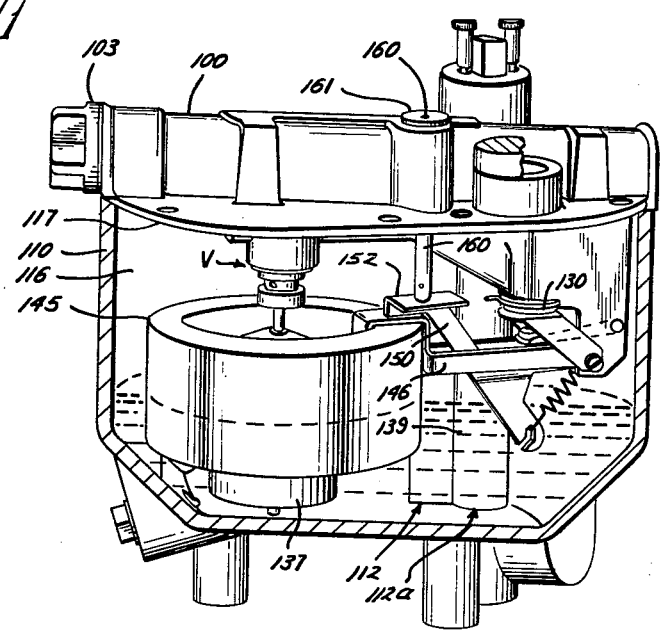
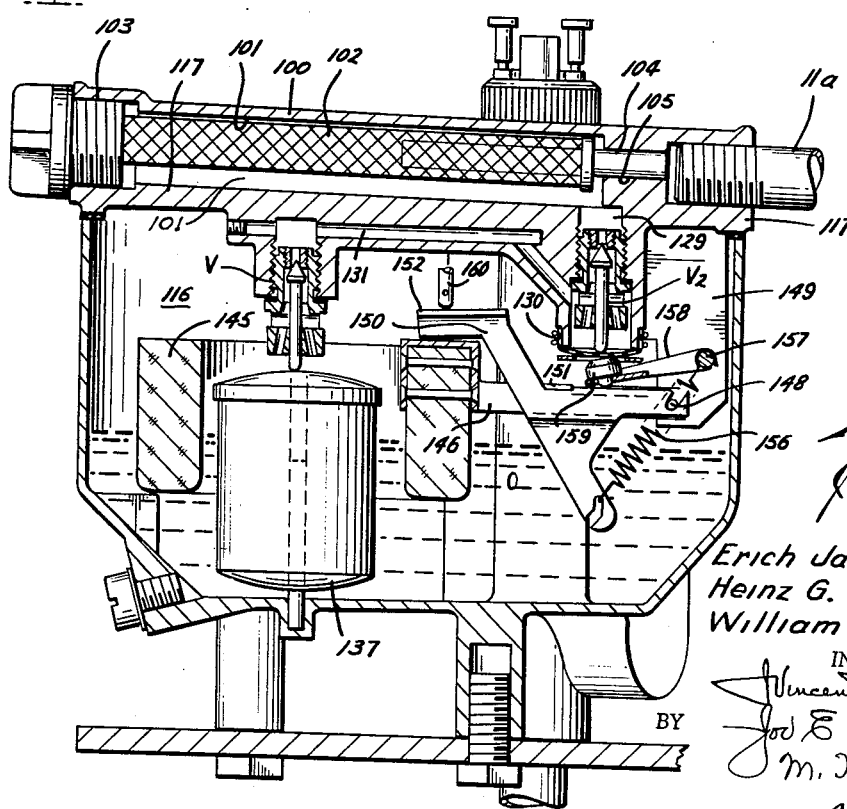

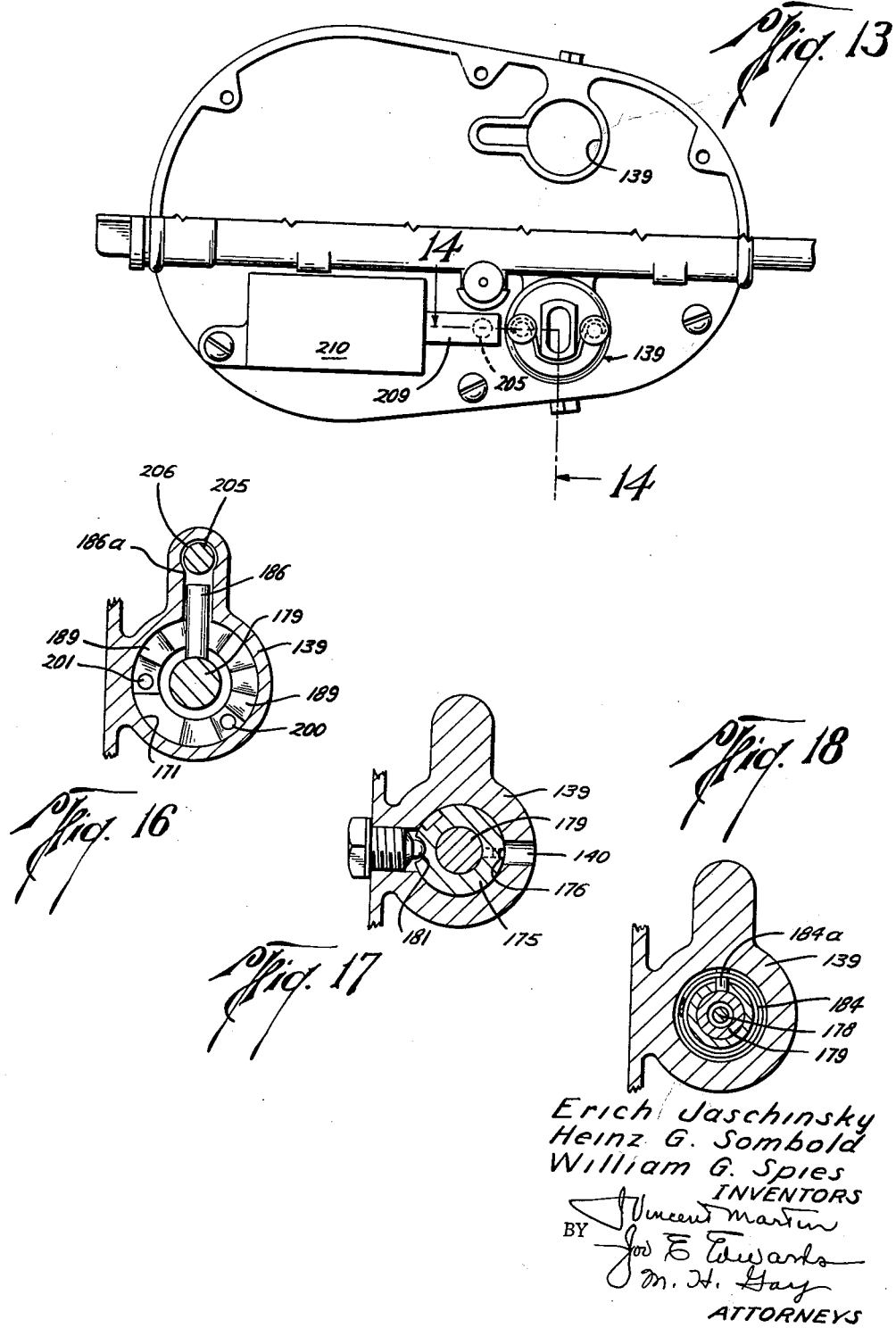

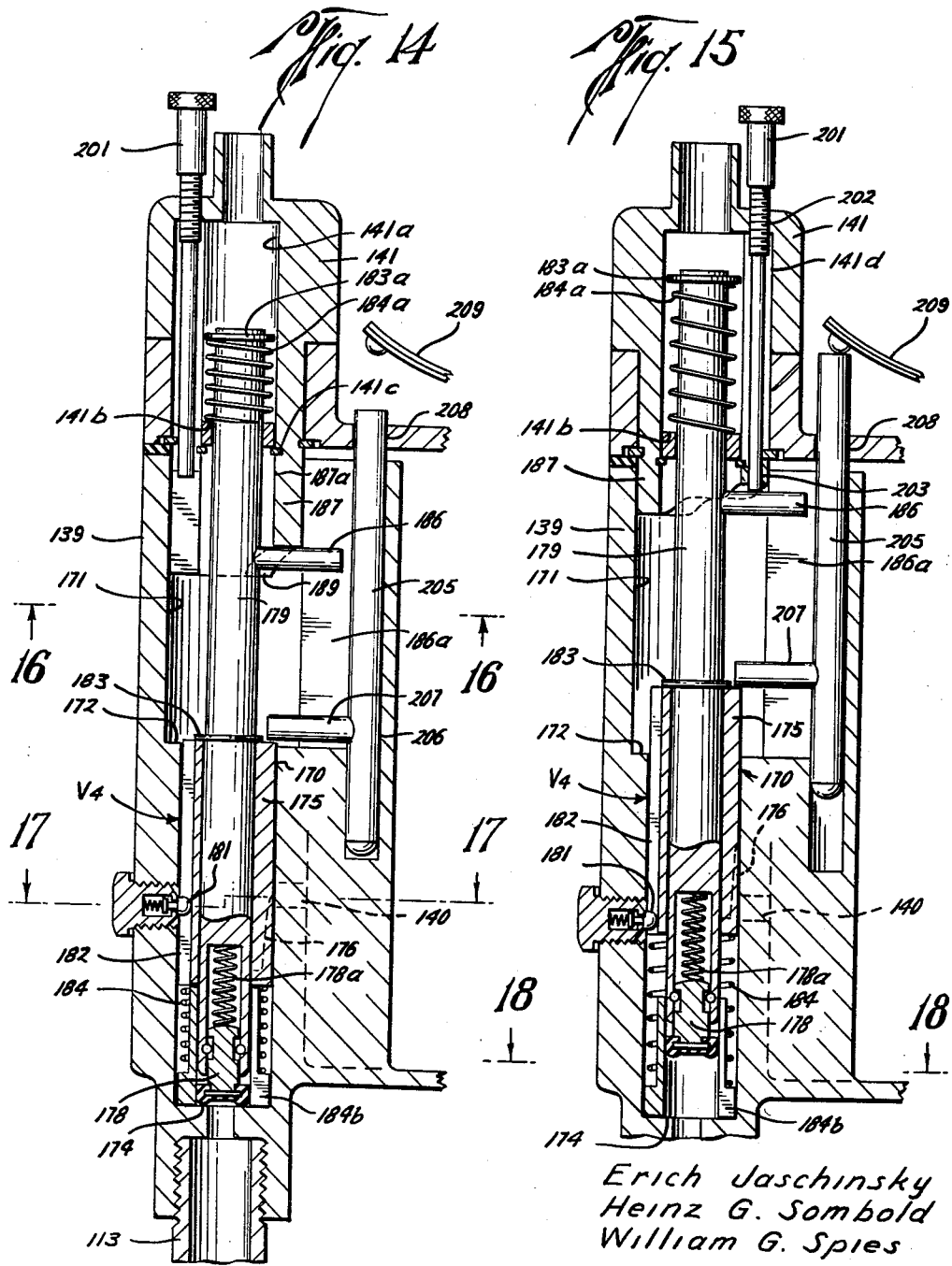

United States Patent Office 3,077,897
Patented Feb. 19, 1963

3,077,897
FEED CONTROL DEVICES FOR LIQUID FUEL BURNERS
Erich Jaschinsky, Pinneberg, near Hamburg, Heinz G. Sombold, Hannover, Germany, and William G. Spies, Bloomfield, N.J., assignors to Mission Manufacturing Company, Houston, Tex., a corporation of Texas
Filed Apr. 24, 1959, Ser. No. 808,839
3 Claims. (Cl. 137—400)

This invention relates to new and useful improvements in feed control devices for liquid fuel burners.

This application is filed as a continuation-in-part of our co-pending application, Serial No. 691,510, filed October 21, 1957, now abandoned.

In the operation of a burner apparatus, such as the oil burner of a heater, it is necessary to properly regulate the flow of liquid fuel to the burner in accordance with the heating requirements. To effectively meter the fuel through a regulating or control valve, an ample supply of the liquid fuel is necessary and such supply is ordinarily maintained in a feed control device which has a supply chamber therein. For the purpose of assuring an ample supply in the chamber at all times, it has been the practice to maintain a predetermined liquid level in the supply chamber, with said level being controlled by a float-actuated main valve. So long as all parts of the device are operating properly, efficient burner operation is obtained, but if any malfunctioning occurs, particularly in the main valve and its float controlled mechanism, the liquid level in the supply chamber may rise to the point of overflowing. To eliminate this possibility, attemps have been made to provide an additional safety valve at some point in the supply line connected with the chamber, which safety valve closes to shut off the liquid fuel in the event the liquid level in the chamber rises to a dangerously high level. However, where the device must include the main valve, the outlet valve and the safety valve, together with their associated operating mechanisms, the problem of constructing a compact, simple and efficient device capable of accomplishing the purpose is presented.

It is, therefore, one object of this invention to provide an improved feed control device for burner apparatus which includes a main float-actuated valve, a safety float-actuated valve and a manually adjusted outlet control valve and which is compact and simple in construction whereby a single unitary assembly of a size readily applicable to any burner apparatus is produced.

Another object is to provide a feed control device of the character described wherein the inlet line to the supply chamber is incorporated within the cover member of the device and also wherein the main valve as well as the safety valve and its actuating mechanism are also mounted in and upon the underside of the cover member, whereby a compact, relatively small unit is possible and also whereby removal of the cover renders all of the operating parts of the device readily accessible for repair or replacement.

An important object is to provide a feed control device having a single liquid supply chamber in which both the main float, controlling operation of the main valve, and the auxiliary float, controlling operation of the safety valve, are disposed in said chamber; the auxiliary float being annular and surrounding the main float whereby both floats may efficiently operate in a minimum space and separate float chambers are eliminated.

Another object is to provide a device of the character described wherein the main float directly engages the main valve to control its position while the auxiliary float engages the safety valve through a mechanical advantage actuating linkage to assure positive closure of said safety valve; said safety valve actuating linkage being so arranged that upon closing of the safety valve, said valve remains closed until manually reopened.

A further object of the invention is to provide a control device of the character described wherein the inlet filter element may be disposed in the cover member or may be disposed in an inlet conduit which is accessible through said cover member, whereby said filter element is readily accessible for cleaning or replacement.

Still another object is to provide a device of the character described having an improved outlet control valve, together with means accessible from the exterior of the device for adjusting said valve to properly regulate the feed to the burner or other apparatus; the adjusting means including a latching arrangement which positively maintains the valve in its adjusted positions.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is a view, partly in section and partly in elevation, illustrating a feed control device, constructed in accordance with the invention, applied to a burner apparatus;

FIGURE 2 is an isometric view of a feed control device;

FIGURE 3 is a sectional schematic view with the outlet of the control device revolved out of position and into the same plane as the inlet in order to more clearly illustrate the flow pattern through the device;

FIGURE 4 is a vertical sectional view taken through the float member and showing the actuating mechanism for closing the safety valve in a position with said valve open;

FIGURE 5 is a similar view of the upper portion of the device with the safety valve and main valve in closed position;

FIGURE 5A is an isometric view of the safety valve-actuating lever showing its relationship to the float operating arm;

FIGURE 6 is a partial sectional view illustrating the indicator element which is operated by the actuating mechanism when the safety valve is closed;

FIGURE 7 is a longitudinal sectional view of the outlet valve and its associated parts and illustrating said valve in a closed position;

FIGURE 8 is a similar view with the valve in an open position;

FIGURE 9 is an enlarged horizontal cross-sectional view taken on the line 9—9 of FIGURE 7;

FIGURE 10 is a partial sectional view of a slightly modified form of the outlet valve;

FIGURE 11 is an isometric view with portions of the housing broken away, and illustrating a modified form of control device;

FIGURE 12 is a longitudinal sectional view of the modified form of the invention and illustrating the inlet filter, the main valve and the safety valve, together with their associated mechanism;

FIGURE 13 is a plan view of the modified form of the invention shown in FIGURES 11 and 12 with one of the outlet control valves removed;

FIGURE 14 is a vertical sectional view taken through one of the outlet control valves of this form and generally following the lines 14—14 in FIGURE 13;

FIGURE 15 is a view similar to FIGURE 14 showing the valve in open position;

FIGURE 16 is a horizontal cross-sectional view taken on the line 16—16 of FIGURE 14;

FIGURE 17 is a horizontal cross-sectional view taken on the line 17—17 of FIGURE 14;

FIGURE 18 is a horizontal cross-sectional view taken on the line 18—18 of FIGURE 14; and FIGURE 19 is a view, partly in section and partly in elevation, illustrating one of the fine adjustment stems for adjusting the outlet valve.

In the drawings (FIGURE 1), the latter A designates the improved control device of the present invention which includes a housing 10 having a liquid fuel inlet 11 and a liquid fuel outlet 12. The outlet is connected by a suitable line 13 to a liquid fuel consuming apparatus, such as a burner 14 of a standard burner apparatus B. As will be explained, the device A is arranged to maintain a predetermined fuel liquid level within the housing A and from this reservoir supply the liquid fuel is fed through the outlet 12 and line 13 to the burner. In actual practice the device A may be mounted on a bracket or other support 15 which is suitably secured to the exterior of the burner apparatus B.

The device A includes the housing 10 and the interior thereof forms a liquid chamber 16 (FIGURES 1, 3 and 4) which functions as a liquid reservoir. The open upper end of the housing and the chamber formed therein in closed by a cover member or plate 17 which is secured thereto by screws 18; a suitable sealing gasket 19 is interposed between the upper edge of the housing and the cover.

The inlet 11 of the housing has a suitable supply pipe 11a connected therewith and such inlet communicates with a cylinder 20 which extends vertically through the interior of the housing (FIGURE 3). The cover member is formed with an enlargment or boss 21 and this boss has a vertical opening 22 which is located in vertical alignment with the inlet cylinder 20. A closure cap 23 is insertable through the opening 22 and has threaded connection with the upper end of the cylinder; the cap is formed with an axial opening 24 which communicates through passages 25 with an annular channel 26. A suitable filter element or screen 27 may be disposed within the inlet cylinder 20.

Liquid fuel entering the inlet cylinder 20 through the supply pipe 11a passes through the filter 27 and flows into the cap member 23, finally reaching the annular channel 26. The channel 26 is in communication with a longitudinal passage 28 which is formed in the enlargement or boss 21 of the cover. Passage 28 communicates with an enlarged chamber 29 also formed in the boss and in the cover 17 and having its lower end closed by a resilient diaphragm element 30. Another passage 31 extends from the chamber 29 and has its other end communicating with the main chamber 16 formed within the interior of the housing. It is thus evident that liquid fuel from the inlet line 11a (FIGURE 3) may flow upwardly through the inlet cylinder 20, then through the annular channel 26, passage 28, chamber 29 and passage 31 into the main chamber 16.

For controlling the admission of the liquid fuel into the main chamber 16 in order to maintain a predetermined liquid level within said chamber, an upwardly closing main valve V is provided. As shown in FIGURE 4, this valve includes a tubular valve casing 32 which is threaded into a depending collar 33 formed on the underside of the cover 17. A valve seat 34 is threaded into the upper end of the valve casing and the upper end of a valve element 35 is adapted to engage said seat to close flow from the passage 31 into the main chamber 16. The valve element is formed with a depending stem 36 which rests upon the upper end of a float 37, which float is mounted upon a guide rod 38.

As the liquid level within the chamber rises beyond a predetermined point, the float 37 is lifted and results in moving the valve element 35 into engagement with its seat to shut off further entry of liquid into the main supply chamber 16 of the housing 10. As the liquid level falls, the float is lowered and through the action of gravity, the valve element 35 is unseated to admit additional liquid. So long as the main valve is functioning properly, the flow of liquid into the chamber 16 is controlled thereby and the main float 37 controls said valve.

The liquid fuel is directed from the chamber 16 through an outlet cylinder 39 (FIGURE 3) which extends vertically within the chamber and which has its lower end in communication with the outlet 12 of the device. As explained, the outlet has connection with the outlet line 13 extending to the burner. The liquid from chamber 16 enters the outlet cylinder 39 through a radial port 40 which is formed in the wall of said cylinder and for metering the flow to the outlet line, an outlet control valve V1 is provided. As will be explained, the position of the valve V1 is controlled by an external control knob 41 which is provided at the upper end of the device. By properly adjusting the valve V1, the amount of fuel flowing to the burner may be adjusted.

From the foregoing it will be seen that liquid fuel enters the device through inlet 11, flows through the various passages and enters the main chamber 16 past the main control valve V. This main valve is actuated in accordance with liquid level by means of the main float 37 and, therefore, a predetermined or desired liquid level is constantly maintained. The feeding of liquid fuel from the device 10 to the burner apparatus B is controlled by the outlet valve V1 which may be manually adjusted in accordance with the desired operation.

So long as the main valve V and the outlet valve V1 are functioning properly, the flow is normally into the chamber 16 and out of said chamber at a controlled rate. However, in the event that a malfunctioning should occur, it is possible that the liquid level would build up within chamber 16 above the desired operating level. In such case, it is desirable to shut off the liquid fuel supply to the chamber 16 and for this purpose a safety valve V2 is provided. As clearly shown in FIGURES 3 and 4, the safety valve is located within the chamber 29 which connects the inlet passage 28 with the passage 31 extending to the main chamber and which is upstream of the main valve. This valve includes a valve casing 42a which is mounted in the chamber by suitable threads and said valve casing has a valve seat 42 at its upper end. A valve element 43 is adapted to engage the seat 42 and said element has a downwardly extending stem 44 which rests upon the resilient diaphragm or closure 30 which closes the lower end of the chamber 29. When the valve element 43 is moved upwardly, it will engage seat 42 and will cut off the flow of liquid which would otherwise flow from passage 28 to passage 31. The valve element 43 is normally in its lower or open position as illustrated in FIGURE 4.

For actuating the safety valve V2 in the event that the liquid level within the chamber 16 rises above a predetermined or preselected point, an auxiliary annular float 45 is provided. The float 45 encircles the main float 37 and has an operating yoke or arm 46 secured thereto by suitable bolts 47. The yoke 46 has its extremities pivoted upon a pin 48 which is mounted in a suitable bracket 49 secured to the underside of the cover 17. As the float 45 is raised and lowered due to changes in the liquid level, the yoke 46 is swung on the pivot pin 48, whereby the upper edges of the yoke arms are moved in the manner illustrated in FIGURE 5.

Mounted between the parallel side arms of the yoke 46 is an actuating lever 50 (FIGURE 5a). One end of the lever is formed with ears 51 through which the pivot pin 48 extends whereby the lever is capable of swinging upon the same center as the yoke. The outer end of the lever has a transversely extending lug 52 and said lug projects over the upper edge of one of the yoke arms. Beyond the yoke the lug 52 is formed with an upwardly offset portion 53, the purpose of which will be hereinafter explained.

For normally maintaining lever 50 in the position of FIGURE 4 with the flat lug 52 engaging the upper edge of the yoke, said lever is formed with depending extensions 54 and a transverse pin 55 is disposed in the lower portion of said extensions. A coil spring 56 has one end secured to the pin 55 with its opposite end secured to a pin 57 which is mounted in the supporting bracket 49. With the lever 50 in the position shown in FIGURE 4, pins 55 and 57 are in a plane which passes through both pins and the pivot pin 48 upon which the lever is mounted; in such position, the spring functions to maintain the extension lug 52 in contact with the yoke. When the annular auxiliary float 45 is raised due to a rise in liquid level, this swings the yoke 46 upwardly applying an upward force through the lug 52 to the outer end of the lever 50. This swinging motion of the lever causes the pin 55 at the lower end of the lever to which the spring is attached, to move out of straight line alignment with pin 57 and the subsequent action of the spring pulls the lever to an upper position as shown in FIGURE 5. When in such upper position, the float 45 and its loke 46 may be lowered without returning the lever to its original position.

In order to operate the safety valve V2 upon swinging of the lever 50, a pivoted actuating arm 58 has one end pivoted to the pin 57 to which the spring 56 is attached. This arm overlies the upper surface of lever 50 and has a roller 59 which rests upon said surface. As shown in FIGURE 4, the roller 59 is confined between the upper surface of the lever 50 and the resilient diaphragm 30 upon which the valve element 43 of safety valve V2 is resting. Upward swinging of the lever 50 by the action of the float 45 and its yoke 46, as above explained, effects an upward swinging of the actuating arm 58 causing the roller to move the valve element 43 of the safety valve V2 to its closed position as shown in FIGURE 5. It is, therefore, obvious that any time that the liquid level in chamber 16 rises beyond a preselected point, the auxiliary float will actuate the lever 50 to swing the actuating arm 58 and close the safety valve V2.

Because of the movement of spring 56 to an off-center position when the lever is swung upwardly, said lever will remain in such upper position even though the yoke and auxiliary float may thereafter be lowered. To return the lever 50 to its original position, a manually actuated resetting pin 60 (FIGURE 6) is provided. This pin extends through a vertical opening 61 formed in one end of the boss 21 of the device and has its lower end guided through the bore 62 of a plug member 63. A valve disk 64 on the pin 60 is adapted to engage the upper end of the plug to close its bore when said pin is in a lowered position. The lower end of the resetting pin is in constant engagement with the offset 53 of the lug 52 which is secured to the outer end of the lever 50. The upper end of the pin projects from the opening 61 and also serves as an indicating element.

With lever 50 in its normal inactive position as shown in FIGURE 4, the indicating and resetting pin 60 is in lowered position with respect to the upper end of the boss 21. However, when lever 50 swings upwardly to the positions of FIGURES 5 and 6, pin 60 is raised and due to the fact that the lever is retained in its upper position, will remain in raised position to indicate to the operator that the safety valve has been closed. Upon manual depression of the pin, lever 50 is returned to its initial or normal position as shown in FIGURE 4.

The main float 37 and main valve V maintain the desired or predetermined liquid level within the main chamber 16 which acts as a reservoir containing an adequate liquid fuel supply. The liquid is conducted to the burner B in accordance with the particular requirements and the flow of liquid from the chamber or reservoir 16 is controlled by the outlet valve V1. The structure of such valve is clearly shown in FIGURES 7 and 8.

The outlet valve V1 is disposed within the vertical outlet cylinder or tube 39, which, as explained, has the feed line 13 extending therefrom. The cylinder or tube 39 is formed with a bore 70 having an enlarged counter-bore 71 in its upper portion whereby an annular internal shoulder 72 is formed. The extreme lower end of the bore is reduced as indicated at 73 to provide an annular valve seat 74. A tubular valve piston element 75 is slidable within the bore 70 of the cylinder and has its external surface formed with a tapered longitudinally extending groove 76. The piston element is movable axially within the bore 70 with respect to the port 40 which extends through the wall of the cylinder and which communicates with the main chamber 16. Diametrically opposite the groove 76 is a flat spring 77 which is secured to the piston and which engages the wall of the cylinder bore, said spring functioning to maintain the exterior of the cylinder adjacent the groove in close contact with the bore of the cylinder.

Since the groove 76 in the piston is of varying cross-section, it will be evident that as the piston moves axially within the cylinder and with respect to the port 40, the volume of liquid entering the lower portion of the cylinder or tube will be varied. When the piston is in lowered position, a spring pressed ball valve 78, which is mounted within the lower end of the piston, engages the seat 74 to completely close flow to the outlet line. An upward movement of the piston element 75 within the cylinder unseats the ball valve to allow a flow of liquid from the main chamber 16 to the outlet line 13. Of course, after the ball valve is unseated, the volume of liquid flowing to the outlet line is controlled by the relative position of the feed groove 76 in the piston element with respect to the radial port 40.

For imparting axial movement to the piston 75 and its ball valve 78, a valve actuating rod 79 has its lower end extending into the bore of the piston element 75 and such lower end is attached to the piston by a swivel connection 80 (FIGURE 9). Such swivel connection permits rotation of the rod 79 with respect to the piston but any longitudinal movement of the rod is imparted to the said piston. As illustrated, the swivel connection includes a collar 80c which is rotatably secured to the lower end of rod 79. This collar is connected with the piston element 75 through a transverse pin 81 (FIGURE 9) and the end of said pin engages within a groove 82 in the wall of the cylinder 39; thus, the pin 81 attaches the actuating rod 79 to the piston element and at the same time prevents rotation of the piston element within its cylinder to maintain alignment of the feed groove 76 with the port 40.

The upper portion of the actuating rod is enlarged in diameter to form an external shoulder 83 intermediate the ends of the rod and said rod is constantly urged in an upward direction by a coil spring 84 which is confined between the internal shoulder 72 within the cylinder 39 and a washer 85 located below said shoulder 83. Upward movement of the actuating rod is restricted by the engagement of a radial pin 86 with an annular control cam 87. As shown in FIGURES 7 and 8, the control cam is secured to the underside of the cover 17 by suitable screws 88 and its lower annular edge is formed with stepped recesses 89. When the actuating rod 79 is rotated to locate the pin 86 in engagement with the lowermost recess of the control cam as shown in FIGURE 7, the piston element 75 is in its lowered position and the ball valve 78 is seated to close flow to the outlet line 13. By rotating the rod 79 to permit engagement of the control pin 86 with a progressively higher recess 89 in the control cam, the spring 84 may move the piston 75 and its ball valve 78 upwardly; the amount of movement is, of course, controlled by the particular recess engaged by the control pin 86. Therefore, the position of the piston element 75, which, through its feed groove 76, controls the volume of liquid flowing from the chamber, effects a control of the liquid flowing to line 13.

Manual rotation of the rod 79 to properly locate the control pin 86 is effected by the control knob 41 which is connected to the extreme upper end of rod 79. The control knob 41 encircles a boss 90 formed on the upper surface of cover 17. If desired, said knob may be formed with an angular recess 41a for receiving the angular end of a wrench or other operating member.

The operation of the outlet valve V1 is obvious from the foregoing. With the control pin 86 of the actuating rod 79 engaged with the lowermost recess 89 on the control cam 87, the ball valve 78 is in seated position and flow from the main chamber 16 to the outlet line 13 is shut off. At this time the coil spring 84 is tending to urge the rod 79, piston element 75 and ball valve upwardly but the engagement of the control pin with the recess 89 prevents such upward movement. The ball valve 78 is maintained on its seat by a coil spring 78a which is confined between the ball and the collar 80a of the swivel connection.

To permit unseating of the ball valve 78 to allow a flow to the outlet line 13, the knob 41 is rotated which results in a rotation of the actuating rod. Such rotation moves the control pin 86 on the rod into one of the upper recesses 89 on the control cam thereby permitting the spring 84 to move the actuating rod, piston element 75 and ball valve 78 upwardly. Flow may then occur from the main chamber 16 through port 40, feed controlling groove 76 and past unseated ball valve 78 to the outlet. By rotating the actuating rod 79 to locate its control pin 86 in the uppermost recess 89 of the control cam, the spring 84 can move the valve to its uppermost or wide open position as shown in FIGURE 8. In this position maximum flow into the outlet line 13 is possible. It is, of course, evident that the positioning of the control pin 86 in any one of intermediate recesses 89 of the control cam 87 adjusts the volume of liquid flowing to the outlet, such adjustment being accomplished because of the variable cross-section of the feed groove 76 in the piston.

A modified form of control valve is illustrated in FIGURE 10. In this form a piston element 75a has a spring pressed ball valve 78b carried by its lower end. Rotation of the piston with respect to the cylinder is prevented by a pin 81a which engages a groove 82a in the wall of the cylinder 39. Instead of the swivel connection 80, the lower end of the actuating rod 79 is formed with a ball 80a which engages a seat 80b provided within the cylinder. A coil spring 78c is confined between ball 80a and the ball valve 78b. The same coil spring and control cam arrangement is employed in this form of outlet valve.

The operation of the modified form shown in FIGURE 10 is substantially the same as the operation of the valve illustrated in FIGURES 7 and 8. By adjustment of the control pin 86 with respect to the control cam 87, the coil spring 84 may move the piston element 75a and the ball valve 78b upwardly. As in the first form, the valve is closed when the control pin is in the lowermost recess of the control cam and is in full open position when said pin is engaged with the uppermost recess of said cam.

In the operation of the control device A, the same is connected with the burner apparatus B in the manner shown in FIGURE 1. Liquid fuel is supplied through inlet line 11a and is passed through filter 27 after which it flows through passages 28 and 31 past main valve V and into the main chamber 16. Operation of the main valve V as controlled by the main float 37 maintains a predetermined liquid level within the chamber 16. The control knob 41 is utilized to properly position the outlet valve V1 so that the desired flow of fuel to the burner apparatus may occur. The outlet valve, being controlled by the external knob 41, may be manually adjusted to suit conditions.

So long as the predetermined liquid level is maintained and the main valve as well as the outlet valve are functioning properly, the auxiliary float 45 does not actuate the lever 50 which controls the safety valve V2. However, in the event that the liquid level in chamber 16 rises above a predetermined level, then auxiliary float swings the yoke 46 and such yoke, being in engagement with the overhanging lug 52 of lever 50 swings said lever upwardly. As lever 50 swings upwardly, the spring 56 connected therewith is moved off center and effects complete upward movement of the lever. Because the lever is in engagement with the roller 59 of the pivoted arm 58, said arm is swung upwardly to effect a closing of the safety valve. At the same time upward swinging of the lever moves the indicating and resetting pin 60 upwardly to provide a visual indication that the safety valve has been closed. The parts remain in this position and the device remains inactive until the pin 60 is manually depressed to return the lever 50 to its normal position to again open the safety valve and place the control of liquid supply into the chamber upon the main valve V.

One of the features of the present invention resides in the arrangment whereby all of the operating parts of the device are mounted in or upon the cover member 17. As can be seen by observing the schematic sectional view of FIGURE 3, the various passages which extend from the inlet cylinder 20 to the main chamber are formed in the cover. Also the main valve, the outlet valve V1 and the safety valve V2, as well as the auxiliary float and its associated parts, are carried by the cover. Therefore, when the cover is removed, all of the important operating parts are removed as a single unit and are readily accessible for repair or replacement. Attention is also called to the fact that the filter 27, which is located within the inlet cylinder, may be easily replaced at any time by merely removing the cap member 23 which closes the upper end of the inlet cylinder. This makes the filter readily accessible for replacement at any time.

Another form of the invention is illustrated in FIGURES 11 to 19. This modification has all of the advantages of the first form but shows the inlet in the upper cover of the device. It also provides a slightly different structure for actuating the safety valve V2 as well as a different type of outlet control valve V1. Also, this modification includes two outlet cylinders or tubes instead of one. Referring specifically to FIGURES 11 and 12, the modified form of the invention includes a main housing 110, the interior of which forms a main chamber 116. A cover member 117 is adapted to close the upper end of the housing and has its central portion formed with a transversely extending enlargement or boss 100. As shown in FIGURE 12, the boss 100 is formed with a bore 101 within which a filter element 102 is disposed. One end of the bore 101 is closed by a threaded plug member 103 which facilitates insertion and removal of the filter element. The opposite end of the bore has a liquid fuel inlet tube 104 extending thereinto and the fuel inlet line 11a has communication with the tube.

In this form the supply of fuel enters through inlet line 11a, flows through tube 104, passes through filter element 102 and into bore 101. The bore 101 is in communication through a port 105 with a chamber 129 in which the safety valve V2 is mounted. Chamber 129 communicates with one end of a passage 131 and said passage has its other end in communciation with the main chamber 116. The main valve V is mounted at the end of passage 131. It is thus obvious that the incoming liquid is introduced into the bore 101 formed in the cover plate and then flows past the safety valve V2, past main valve V and into the main chamber 116. By locating the filter element 102 in the cover, said element is more readily accessible and eliminates the necessity of providing an inlet tube or cylinder such as shown at 20 in the first form of the invention.

The main valve V in the modified form is controlled by a main float 137 and said float functions to maintain a predetermined liquid level in the chamber. Flow from the chamber may be through one of two outlets 112 or 112a. Each outlet includes an outlet cylinder 139 similar to the cylinder 39 of the first form and each of the cylinders include an outlet valve V4 (FIGURES 14 and 15). As shown in FIGURE 13, the outlets 139 are located one on each side of the transversely extending inlet and since each outlet has its own separate valve, each may be connected to a separate burner apparatus. Liquid from the chamber may be directed at a controlled rate through the two outlets so that two separate burner apparatus may operate from the single feed control device. Of course, if desired, only a single outlet may be provided as in the first form.

The safety valve V2 of the modification illustrated in FIGURES 11 and 12 is controlled in its actuation by an auxiliary annular float 145 which is similar to the float 45 of the first form. A yoke or operating element 146 has one end attached to the annular float and its opposite end pivoted on a pin 148 which is mounted in a bracket 149 depending from the cover 117. A lever 150 has one end pivoted on the pin 148 and is provided with a lateral extension 151 which engages the upper edge of the yoke 146. An actuating arm 158 is pivoted on a pin 157 and the outer end of the arm overlies the upper end of the lever. A button 159 carried by the arm 158 engages the diaphragm 130 which closes chamber 129 and said button is disposed below the stem 29 of the valve V2.

When the lever 150 is swung by reason of the auxiliary float rising, arm 158 is moved upwardly to close the safety valve V2. A coil spring 156 is connected between the lower end of the lever 150 and the pin 157 and functions in the same manner as the spring 56 of the first form. The outer end of the lever 150 is formed with an extension 152 which engages the lower end of a resetting and indicating pin 160. The pin 160 projects upwardly through the cover 117 and has an indicating disk 161 secured to its extreme upper portion. Pin 160 provides a visual indication as to the closing of the safety valve V2 and is also utilized to reset or return the lever 150 to its initial position.

The outlet valves V4 in the two outlet cylinders 139 are of identical construction and one of such valves is illustrated in FIGURES 14 to 19. Each cylinder has an axial bore 170 with an enlarged counter-bore 171 whereby an internal shoulder 172 is formed. A piston element 175 is slidable within the bore 170 and is maintained against rotation therein by a spring pressed pin 181 which rides within a groove 182 formed in the exterior of said piston. A feed control groove 176, which is of varying cross-section, is cut into the external surface of the piston 175 and this groove co-acts with a port 140 which establishes communication with the chamber 116.

A valve actuating rod 179 has its lower portion extending through the bore of the piston 175 and a valve 178 has swivel connection with the lower end of said rod. The valve is adapted to engage a seat 174 at the lower end of the bore 170. A spring 178a constantly urges the valve 178 downwardly with respect to the actuating rod 179.

An annular external flange 183 is secured to the actuating rod 179 and this flange abuts the upper end of the piston 175. The piston is maintained in engagement with the annular flange by means of a coil spring 184, said spring being confined between the lower end of the piston and a flanged sleeve 184b. It will be evident that when the rod 179 is moved upwardly from the position shown in FIGURE 14, valve 178 will be unseated and piston 175 will move upwardly relative to the port 140; such movement of the piston relative to the port will change the position of the feed control groove 176 relative to said port and will thereby effect a change in the volume of liquid which is flowing to an outlet line 113 which connects with the lower end of the outlet cylinder.

Above the annular flange 183 the actuating rod 179 is provided with a radially extending control pin 186. This pin is of sufficient length to extend into a groove 186a (FIGURE 16) which is formed at one side of the cylinder 139. The engagement of the pin 186 within the groove prevents rotation of the rod 179. The upper end of the rod projects into the bore 187a of an annular control cam 187. The control cam 187 is similar in construction to the cam 87 of the first form, being provided with a plurality of stepped recesses 189 which are adapted to receive the radial control pin 186.

Instead of being secured to the cover plate as in the first form, the control cam 187 is secured to the lower end of the rotatable control knob 141. The bode 141a of the control knob forms an extension of the bore 187a of the control cam and the upper end of the actuating rod 179 extends into these bores. An internal annular shoulder 141b is formed within the bore 141a by a collar which is supported by a snap ring 141c. An annular flange 183a is secured to the extreme upper end of the actuating rod 179 and a coil spring 184a is confined between the flange 183a and the shoulder 141b, this spring constantly exerting its pressure to urge the actuating rod upwardly.

In the operation of the valve shown in FIGURES 14 and 15, the valve element 178 is in seated or closed position when the control pin 186 of the actuating rod 179 is in the lowermost recess 189 of the control cam 187. Upon a rotation of the knob or control element 141, the control cam 187 is rotated with respect to the pin 186 and this moves the next succeeding or higher recess 189 in the lower edge of the control cam 187 in alignment with the control pin 186. Because of the action of spring 184a, which is constantly urging the actuating rod 179 upwardly, said rod moves upwardly to unseat valve 178. At the same time the feed control groove 176 is moved relative to the radial port 140 and a flow of liquid from the main chamber 116 to the outlet 113 occurs. By adjusting the position of the control cam with respect to the control pin 186, the position of the valve and of the feed control groove 176 is controlled.

The stepped recesses or notches 189 in the lower edge of the control cam 187 provide for incremental movement of the actuating rod and have been found satisfactory as a control of the intermediate positions of the valve. However, at the minimum opening of the valve and at maximum opening of the valve an additional fine adjustment has been found desirable. For the purpose of providing such additional fine adjustment, adjusting stems 200 and 201 are associated with the control cam. The stem 201 is illustrated in FIGURES 14 and 15 and, as shown, extends downwardly through a recess 141d in the adjusting knob 141, being threaded therein at 202. The lower end of the stem projects through an opening 203 formed in the annular control cam and the lower end of said stem terminates adjacent the surface of the uppermost recess 189 of the cam. This uppermost recess is the one which is engaged by the control pin 186 when the valve is in full open positon as shown in FIGURE 15.

With the fine adjustment stem 201, it will be evident that after the valve is moved to full open position by having rotated the control cam to locate its uppermost recess 189 for reception of the pin 186, the stem 201 may be rotated to adjust its lower end. Such adjustment causes the lower end of the stem to contact the control pin 186 and thereby slightly change its position within the recess 189 of the cam. In effect, the lower end of the stem provides an adjustable surface which may be varied to give a fine adjustment in the full open position.

The control stem 200 functions in the same way and is located in the next to the lowest recess 189 of the control cam (FIGURES 16 and 19). Obviously, the lowermost recess 189 of the cam moves the valve 174 to closed position and, therefore, the adjacent recess through which the adjustment stem 200 extends is the minimum opening position of said valve. The stem 200 is also threaded within the adjustment knob 141 and its position may be varied to provide for a fine adjustment of the position of the actuating rod 179, whereby the minimum opening of the valve may be accurately controlled.

In many instances it is desirable to control the position of the piston element 175 in accordance with the temperature in the burner apparatus and for this purpose a control plunger 205 (FIGURES 14 and 15) is provided. This plunger is freely movable within a generally circular recess 206 which is formed adjacent the radial recess 186a (FIGURE 16) in the cylinder 139. The plunger 205 has a lateral pin 207 which extends through recess or slot 186a and has its end overlying the upper end of the piston element 175. The upper end of the plunger extends through an opening 208 in the cover member and underlies the bimetallic element 209 of a thermostat 210 (FIGURE 13). With the piston element 175 and its valve 178 in raised position as shown in FIGURE 15, the upper end of piston 175 has engaged the lateral pin 207, and the plunger has been lifted upwardly so that its upper end is in contact with the bimetallic element 209. The bimetallic element 209 is controlled by thermostat 210 which is in turn controlled by the heat in the area being heated. If the temperature rises above the temperature for which thermostat 210 is set, then the bimetallic element 209 applies a downward force to the plunger 205 and this results in sliding the piston element 75 downwardly on its stem 179. Such downward movement of the piston element 175 adjusts the feed groove 176 of the piston element to reduce the volume of liquid flowing to the burner apparatus and cuts down on the heat. After such movement of the piston by the plunger 205, the thermostat may control the piston 175 to adjust valve 178. It is noted that the plunger 205 can only move the piston within the limits of the space between the flange 183 on the supporting stem 179 and the valve seat 174; however, within this limit an automatic control of the valve can be obtained.

The operation of the modified form illustrated in FIGURES 11 to 19 is the same as that hertofore described with respect to the first form. The outlet valves V4 of the two outlet openings are properly adjusted to control the liquid supply to the burner apparatus. In the event that either the main valve V or the outlet valves V4 do not function properly and the liquid level rises within the chamber 116, lever 150 is operated to close the safety valve. As in the first form, all of the operating parts of the device are supported by the cover plate and removal of said plate renders all of such parts readily accessible for replacement or repair. In the modification of FIGURES 11 and 12, the inlet filter is also mounted in the cover 117 and is easily accessible for cleaning or replacement merely by removing the plug 103. By arranging the main float within the annular auxiliary float, space is conserved and the entire mechanism may be simplified and made more compact. The particular structure which actuates the safety valve V2 of both forms of the inventtion is such that once closed, the valve remains closed until the manual resetting pin or plunger is depressed.

The foregoing disclosure and description of the invention is illustrative and explanatory thereof and various changes in the size, shape and materials, as well as in the details of the illustrated construction may be made within the scope of the appended claims without departing from the spirit of the invention.

What we claim is:

1. In a feed control device for liquid fuel consuming apparatus including, a housing having a chamber therein forming a fuel supply reservoir, an inlet passage having one end in communication with said chamber, a main valve in said passage for controlling flow into the chamber, a main float within the chamber and co-acting with the main valve to control the position thereof and thereby maintain a predetermined liquid level in said chamber, a safety valve assembly comprising, a safety valve in said inlet passage upstream of the main valve and biased in an open position, an auxiliary float in said chamber, an operating member having one end attached to the auxiliary float and its other end pivoted within the chamber whereby said operating member is swung as the auxiliary float rises and falls with the liquid level in the chamber, a pivoted actuating lever adjacent the arm and having a part engageable by said operating member when the latter is swung upwardly, whereby when said operating member is swung upwardly beyond a predetermined point the lever is also swung upwardly, and actuating means co-acting with the lever and with the safety valve, whereby upward swinging of the lever swings the actuating arm to effect a closing of the safety valve.

2. In a feed control device as set forth in claim 1, together with tension means connected with the actuating lever for maintaining said lever in its raised position to thereby hold the safety valve closed even though the operating arm is subsequently swung downwardly.

3. In a feed control device as set forth in claim 1, together with tension means connected with the actuating lever for maintaining said lever in its raised position to thereby hold the safety valve closed even though the operating arm is subsequently swung downwardly, and means engageable by the actuating lever and extending through the wall of the housing and movable by upward movement of the lever to indicate closing of the safety valve, said indicator means also being manually movable to subsequently swing the actuating lever downwardly against the tension means to return it to its lowered position.

References Cited in the file of this patent

UNITED STATES PATENTS

| | | |
|---|---|---|
| 876,867 | Duggan | Jan. 14, 1908 |
| 1,695,705 | Ball | Dec. 18, 1928 |
| 2,068,138 | Johnson | Jan. 19, 1937 |
| 2,155,761 | Johnson | Apr. 25, 1939 |
| 2,179,207 | Whitehurst | Nov. 7, 1939 |
| 2,234,088 | Russel | Mar. 4, 1941 |
| 2,273,205 | Kommer | Feb. 17, 1942 |
| 2,301,041 | Hann | Nov. 3, 1942 |
| 2,304,444 | Delancey | Dec. 8, 1942 |
| 2,567,440 | Miller | Sept. 11, 1951 |
| 2,634,746 | Newton | Apr. 14, 1953 |
| 2,646,248 | Cornelius | July 21, 1953 |
| 2,842,157 | Mosher | July 8, 1958 |
| 2,924,423 | Weiser et al. | Feb. 9, 1960 |